(12) United States Patent
Schäfer et al.

(10) Patent No.: US 9,096,183 B2
(45) Date of Patent: Aug. 4, 2015

(54) COMPOSITE PART AND METHOD OF MANUFACTURING A COMPOSITE PART

(75) Inventors: Frank Schäfer, Steinweiler (DE); Jochen Reichhold, Kassel (DE); Thomas Penisch, Karlsruhe (DE)

(73) Assignee: Faurecia Innenraum Systeme GmbH (DE)

( * ) Notice: Subject to any disclaimer, the term of this patent is extended or adjusted under 35 U.S.C. 154(b) by 167 days.

(21) Appl. No.: 13/536,453

(22) Filed: Jun. 28, 2012

(65) Prior Publication Data

US 2013/0004702 A1     Jan. 3, 2013

(30) Foreign Application Priority Data

Jul. 1, 2011   (DE) .......................... 10 2011 106 300

(51) Int. Cl.
| | | |
|---|---|---|
| B32B 7/08 | (2006.01) | |
| B60R 13/02 | (2006.01) | |
| B29C 44/34 | (2006.01) | |
| B68F 1/00 | (2006.01) | |

(52) U.S. Cl.
CPC ................ *B60R 13/02* (2013.01); *B29C 44/351* (2013.01); *B68F 1/00* (2013.01); *B60R 13/0206* (2013.01); *B60R 2013/0293* (2013.01); *Y10T 428/24033* (2015.01)

(58) Field of Classification Search
CPC ............ B32B 7/08; B60R 13/02; B29C 65/02

USPC .......... 428/102, 103, 104; 297/452.62, 452.6, 297/228.12, 228.13, 218.2; 112/418
See application file for complete search history.

(56) References Cited

U.S. PATENT DOCUMENTS

| 3,899,623 | A | * | 8/1975 | Okazaki et al. ............... 442/104 |
| 2007/0145797 | A1 | * | 6/2007 | Itakura ........................ 297/228.1 |

FOREIGN PATENT DOCUMENTS

| DE | 10 2004 053 133 A1 | 5/2006 |
| DE | 102004053133 A1 | 5/2006 |
| DE | 10 2008 060 817 A1 | 6/2010 |
| DE | 102008060817 A1 | 6/2010 |
| DE | 20 2010 016 550 U1 | 4/2011 |
| GB | 2175242 A * | 11/1986 |
| WO | WO 2012/076158 A2 | 6/2012 |

OTHER PUBLICATIONS

Machine translation of DE 202010016550 retrieved Sep. 3, 2013.*
Machine translation of DE 102008060817 retrieved Sep. 3, 2013.*

* cited by examiner

*Primary Examiner* — Alexander Thomas
(74) *Attorney, Agent, or Firm* — Schwegman Lundberg & Woessner, P.A.

(57) ABSTRACT

The invention relates to a composite part having a decor skin with a first and a second section, preferably each including leather, and a holding portion, wherein the first and second sections are connected to one another by a seam and a part region of the decor skin is connected to the holding portion. In accordance with the invention, the part region of the decor skin is preferably connected to the holding portion with material continuity in the region of the seam.

11 Claims, 3 Drawing Sheets

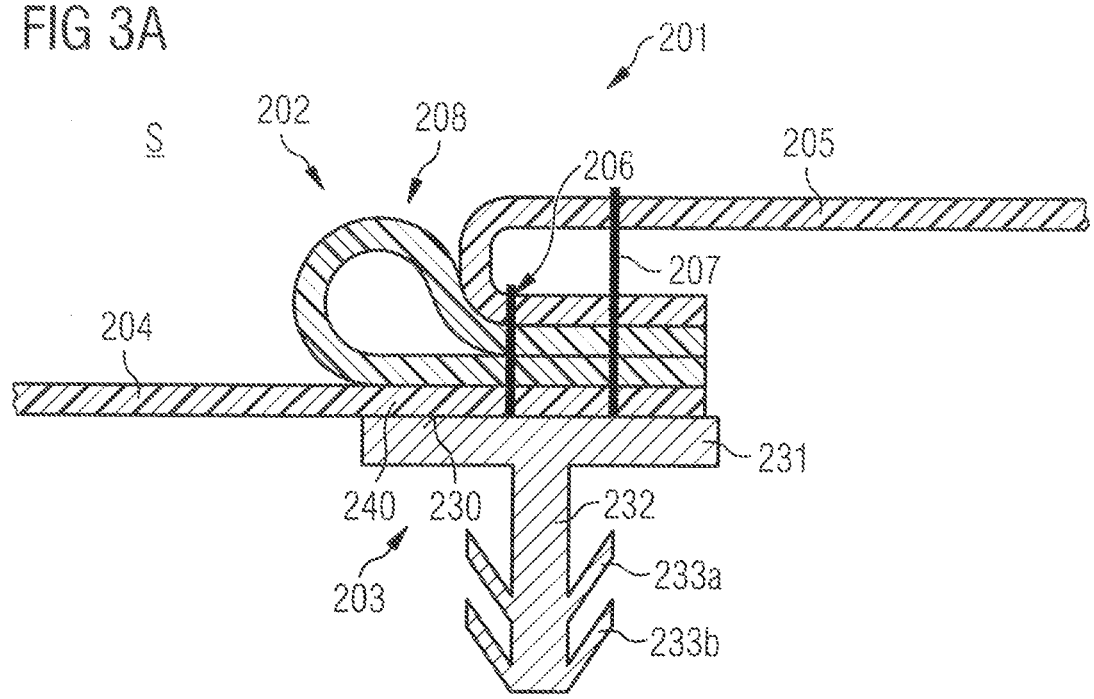
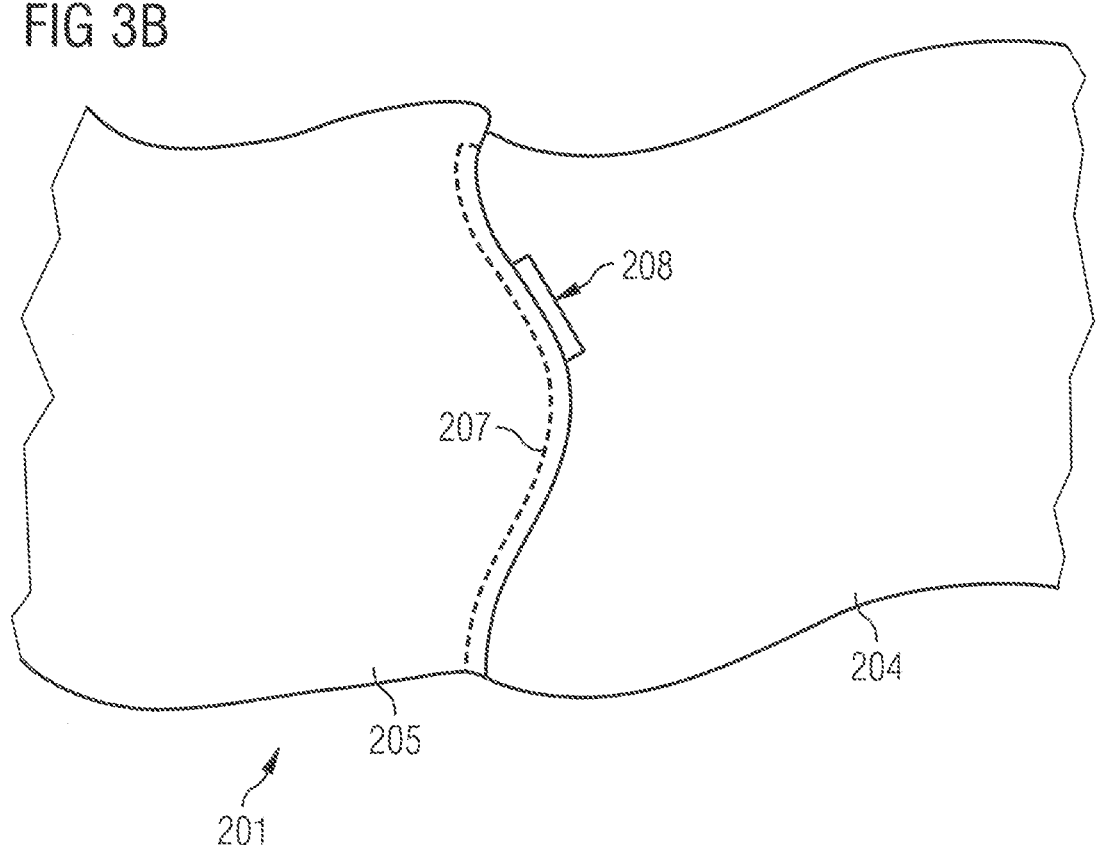

COMPOSITE PART AND METHOD OF MANUFACTURING A COMPOSITE PART

CLAIM OF PRIORITY

This application claims the benefit of priority, under 35 U.S.C. §119 (a)-(d) of German Patent Application Serial No. 10 2011 106 300.9, entitled "VERBUNDTEIL SOWIE VERFAHREN ZUR HERSTELLUNG EINES VERBUNDTEILS," filed on Jul. 1, 2011, the benefit of priority of which is claimed hereby, and which is incorporated by reference herein in its entirety.

TECHNICAL FIELD

The subject of the present invention is a composite part having a decor skin as well as a molded composite and a method of manufacturing a composite.

The composite includes a decor skin having a first section and a second section, preferably of leather or imitation leather or artificial leather, and a holding portion, with the first and second sections being connected to the holding portion via a part region of the decor skin.

BACKGROUND

Such a composite part is known, for example, from DE 10 2004 053 133 A1. Said invention solved the problem of providing a cover having at least one seam for the lining of passenger compartments of motor vehicles with which it is possible to position the seam in a simple manner with respect to a support material on lamination and/or back foaming, where a seal of the decor layer with respect to the foam may be established simultaneously. The connection between the sections of the decor skin and the holding portion takes place via a seam. Since the seam has to pass through the comparatively resistant material of the holding portion, there is comparatively high waste. This should be avoided.

A possibility to avoid waste is disclosed, for example, in DE 10 2008 060 817 A1. For this purpose, a part region of the decor skin is sewed to a seam construction (also known as piping), with the seam construction being connected to a holding section. Since the seam construction comprises a softer material, a seam connecting the decor skin and the seam construction can be produced particularly simply.

SUMMARY

It is the object of the present invention to provide a form of application of a decor skin on a carrier which is simplified with respect to the prior art or is an alternative to the prior art.

The object is achieved with the assistance of the composite part, using a molded composite as well as using a method of manufacturing a composite part.

In accordance with the invention, a part region of the decor skin, preferably in the region of the seam, which connects the first and second sections, is connected with material continuity to the holding portion.

In this respect, the seam is arranged so that it connects the first and second sections to one another and only a side of the first and/or second sections forming the part region of the decor skin which is remote from the visible side of the finished decor skin is connected to the holding portion with material continuity.

The part region can in this respect be formed by an areal region of only the first section, by an areal region of only the second section or from regions of both the first and second sections.

The part region can, for example, be formed by at least one midget seam of the first and/or second sections adjoining the seam connecting the first and second sections. In this respect, both the front side and the rear side of the midget seam can be connected to the holding portion.

Since the part region of the decor skin is connected to the holding portion with material continuity, the introduction of an additional seam connecting the holding portion and the decor skin is no longer necessary. The manufacturing process is hereby simplified and the composite part can be manufactured with less effort than previously.

In particular leather, artificial leather, ultrasuede or another imitation leather are suitable as materials for the first and second sections.

In addition to the possibility of connecting the part region of the decor skin to the holding portion by means of an adhesive connection, for example by a hot-melt adhesive or adhesive layer, it is in particular advantageous if the connection between the part region of the decor skin and the holding portion is a weld connection or if the connection with material continuity is produced by a welding process. A particularly fast process management is in particular made possible by the welding of the part region of the decor skin and of the holding portion. Alternatively, welding and using an adhesive layer may be combined when connecting the décor skin and the holding portion. Examples are found in the figure descriptions.

The part region of the decor skin is preferably arranged with respect to a visible side of the decor skin such that it is only arranged on a region of the front side of the first and/or second sections not facing the visible side or is arranged on the rear side of the first and/or second sections. It must be mentioned at this point that the first and second sections can be formed as sections of a contiguous skin or of a continuous skin or that the first and second sections are each provided by a first skin and a second skin. The term "skin" is in this respect to be understood as decor layers such as are used in the passenger compartment of vehicles. It in particular includes leather, artificial leather and imitation leather.

Further embodiments of the invention are listed in the subordinate claims, independent claims and method claims.

In a further embodiment, the part region of the decor skin is directly connected to the holding portion with material continuity. This in particular means that no further material layer is located between the part region of the decor skin and the holding portion. A further material layer is in this respect likewise to be understood as an adhesive layer. In positive terms, this means that the material of the holding portion is connected to the material of the part region of the decor skin with material continuity, for example by welding or hot air welding. An inexpensive manufacture of the composite part is hereby made possible. In addition, the use of further material layers or of further seams which effect the connection between the holding portion and the decor skin are dispensed with.

In a further embodiment, the holding portion includes at least one cross-member to be welded to the decor skin. A surface of the cross-member which is connected to the part region of the decor skin is in this respect preferably designed as planar an that a connection between the part region of the decor skin and the holding portion with material continuity is created over a sufficiently large region. In a specific variant of this embodiment, the total surface of the cross-members is connected to the part region of the decor skin. In further embodiments at least 70%, preferably 80% or 90%, of the surface of the cross-member is connected to the decor skin. It is naturally equally possible not to design the surface of the cross-member as absolutely planar, but rather as slightly curved with a radius of curvature of more than 60 mm.

In a further embodiment, the holding portion includes, in addition to the cross-member, a spigot engaging at the lower side of the cross-member, with the spigot being able to be arranged, for example, in a cut-out of a support, of a foam layer, of a knitted fabric or of a similar base. In this respect, the spigot can have additional anchors for the better fixing of the holding portion in the support or knitted fabric. Variants of such holding portions can be seen, for example, from the above-named documents DE 10 2004 053 133 A1 and DE 10 2008 060 817 A1.

In a further embodiment, the holding portion to be welded to the part region of the decor skin includes a layer of a thermoplastic material, preferably of a thermoplastic polyester elastomer, in the region of the weld. The thermoplastic polymer is particularly suitable for the hot air welding of the part region and of the holding portion. In particular for the case that the first and second sections are leather or imitation leather, it is advantageous if the layer comprises a thermoplastic polyester elastomer (TPEE). In further embodiments, at least 50%, preferably at least 70% of the holding portion, comprises the thermoplastic material, in particular TPEE; particularly preferably the holding portion consists completely of the thermoplastic elastomer, i.e. TPEE. Such a holding portion can in particular be manufactured inexpensively by an extrusion process.

The TPEE has the surprising property that it can enter into a direct connection with the leather with material continuity. A fast arrangement of the decor skin on the holding portion is hereby in particular made possible in the manufacture of a composite part having first and second sections of leather or imitation leather.

In a further embodiment, the seam between the first and second sections is a seam of yarn, simply called a yarn seam in the following. Yarn seams provide a particularly high-quality impression, but have the disadvantage that the holes introduced into the first and/or second sections result in defective points in the case of a back foaming of the decor skin since foam can exit from the seam holes. It is advantageous for this reason (naturally also in the case of a weld seam between the first and second regions) if the part region which is welded to the holding portion includes an area running fully around the seam so that foam penetrating from the rear side of the decor skin cannot pass through the barrier formed by the part region and the holding portion and thus cannot reach up to the seam holes which connect the first and second sections to one another.

In a further embodiment, the first and/or second sections are folded over once in the region of the seam. The regions can furthermore also be folded over multiple times. A midget seam which is suitable as a section of the part region for fastening the decor skin to the holding portion is usually defined by the folded over region.

In a further embodiment, a seam construction is arranged between the first and second sections of the decor skin. The seam construction or piping often serves the brand placement of the manufacturer with high-quality vehicle parts. However, a weak point between the first and second sections is likewise produced by the seam construction. This was explained above in the presentation of the yarn seam formed between the first and second sections.

It is possible with the assistance of the present invention to provide a good seal between the seams introduced in the first and second sections or the seams introduced into the seam construction and a region (usually the rear side) of the decor skin disposed outside the part region, viewed from the seam. The waste is inter alia hereby reduced.

As already initially mentioned, the composite part presented here is suitable to be connected to a support as part of a molded composite. In this respect, the holding portion is held in a cut-out of the support or in a knitted fabric arranged on the support or on a foam layer or a layer of knitted fabric. In addition, regions of the first and second sections which are not associated with the part region can be connected with material continuity or in another manner to the foam layer, to the support, to the knitted fabric or to the knitted fabric material. The composite part presented here is in particular suitable for arrangement in a molded composite which is only back foamed after the application of the holding portion to the support so that a foam layer is formed between the rear side of the decor skin and the support.

BRIEF DESCRIPTION OF THE DRAWINGS

Further variants of the invention will become clear from the embodiments explained in the following.

There are shown:

FIGS. 3A/B a further variant of a composite part in accordance with the invention;

DETAILED DESCRIPTION

Figure 1:
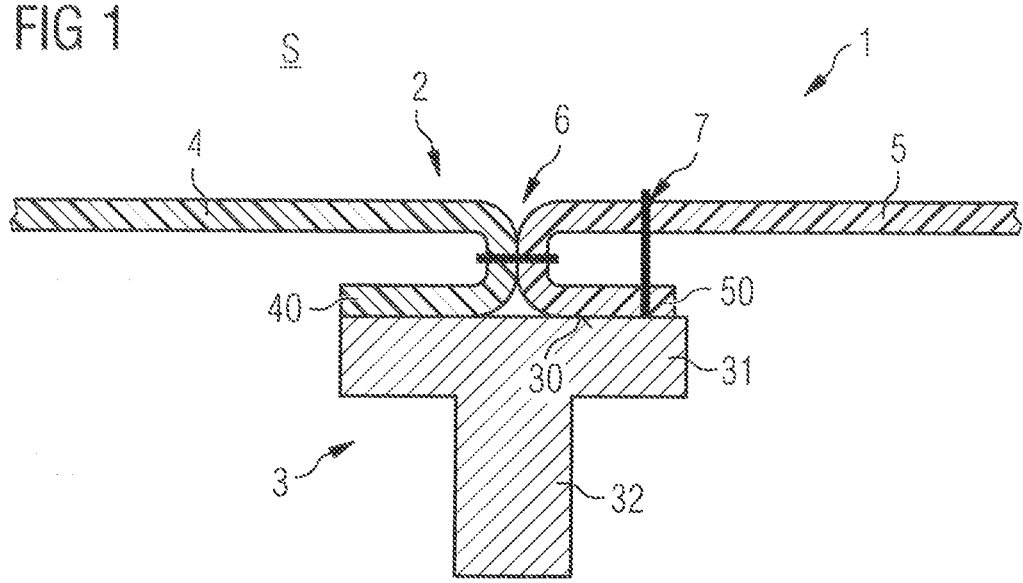
FIG. 1 a first variant of a composite part in accordance with the invention.

FIG. 1 shows a composite part 1 which includes at least one decor skin 2 and a holding portion 3 connected to the decor skin. The decor skin 2 includes a first skin 4 and a second skin 5 which are both made from natural leather in each case. The first and second skins 4, 5 are connected to one another by means of a seam 6. The seam 6 is a yarn seam, i.e. it is formed by means of a yarn which passes through the first and second skins. A decor seam 7 which is visible for a viewer looking from the visible side S is shown beside the seam 6. A midget seam 40 of the first skin and a midget seam 50 of the second skin are located beneath the seam 6. Parts of the front side of the midget seams 40 and 50 are connected with material continuity to the surface 30 of a cross-member 31 of the holding portion.

50% of the holding portion is made of TPEE, with in particular the cross-member 31 containing this material. The spigot 32 adjoining beneath the cross-member 31 can be manufactured, for example, from a different thermoplastic polymer.

To effect the connection with material continuity in the form of the welding between the decor skin 2 and the holding portion 3, the corresponding front sides of the midget seams 40 and 50 are pressed onto the surface 30 of the holding portion 3, with the surface 30 of the holding portion 3 previously having been pre-melted with the aid of hot air so that the front sides of the midget seams 40 and 50 are connected with material continuity to the pre-heated region of the surface 30 on the application of pressure onto the decor skin 2. The composite part 1 manufactured in this manner is comparatively easy to manufacture and can immediately be clipped into a support, for example.

Alternatively, the décor skin 2 and the holding portion 3 may be connected by a hot-melt adhesive instead of or in addition to being welded together. The hot-melt adhesive may be substituted by another adhesive such as a double-sided adhesive film or tape for example. Alternatively, the methods of using adhesive and welding may be combined, for example, a first, non-sticky or sticky, side of an adhesive layer may be welded to the decor skin 2 or holding portion 3 while the other, sticky, second side of the adhesive layer is adhesively connected to the other of the holding portion or décor skin, respectively.

Figure 2:
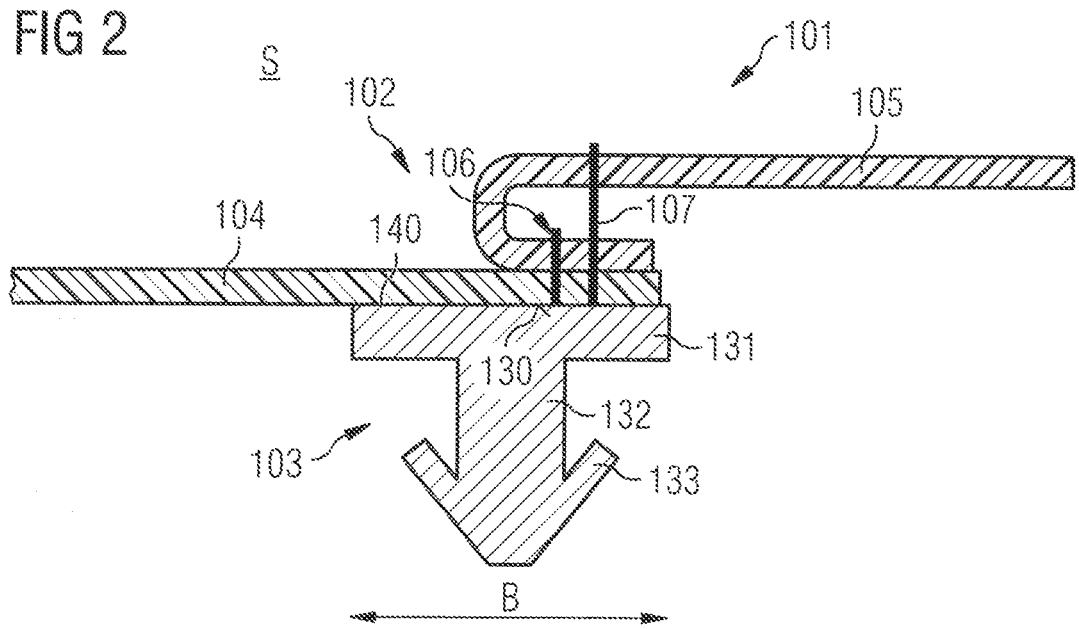
FIG. 2 a further variant of a composite part in accordance with the invention.

A further variant of a composite part is shown in FIG. 2. The composite part 101 includes a decor skin 102 having a holding portion 103. The decor skin 102 includes a first skin 104 and a second skin 105 connected to the first skin. A yarn seam 106, which is completely hidden for the viewer, however, is located between the first and second skins 104, 105. Furthermore, a decor seam 107 passing through the second skin 105 twice is present. In the present example of the composite part 101, the part region of the decor skin 102 is formed by the end section 140 of the first skin 104 remote from the visible side S. The end section 140 extends in this respect substantially over the total width B of the cross-member 131 of the holding portion 103. It can clearly be recognized that the regions of the seams 106 and 107 passing through the end section 140 are completely enclosed by the part region to the left and right of the seams. Since the rear side of the end section 140 is welded to the surface 130 of the holding portion 103, no further material can make its way between the surface 130 and the end section 140 and can thus not pass through holes which have arisen due to the seams 106 and 107 to the surface of the decor skin 102. It must be pointed out at this point that the second skin 105 and equally the first skin 4 and the second skin 5 of the first embodiment are each folded over once.

The first and second skins 104, 105 comprise artificial leather. They are in turn connected to the holding portion 103 which in turn comprises a thermoplastic elastomer. In addition to the spigot 132, the holding portion includes an anchor 133 which serves the better fixing of the holding portion 103, for example in a support.

A further embodiment of a composite part is shown in the FIGS. 3A and 3B. The composite part 201 includes a decor skin 202 and a holding portion 203. The decor skin includes a first skin 204 of leather, a second skin 205 of artificial leather and yarn seams 206 and 207 which also pass through a piping 208 arranged between the first and second skins in addition to the first and second skins. The piping is in this respect made from a material such as wool or silk.

The first skin 204 is connected via an end section 240 to the surface 230 of the cross-member 231 of the holding portion 203. In the embodiment shown here, the connection has been established by hot air welding. The cross-member 231 includes a layer of a TPEE which lies at the surface 230 and which is connected to the leather of the first skin 204 with material continuity after heating.

The holding portion furthermore includes a spigot 232 as well as a first arm pair 233a and a second arm pair 233b of an anchor 233.

In FIG. 3B, the composite part 301 is shown viewed from the visible side S. A section in which the piping 208 projects can be recognized beside the first and second skins 204, 205. A cross-section through this section is shown in 3A. The decorative seam 207 can furthermore be recognized which extends substantially parallel to the dividing line of the first and second skins which is drawn as continuous.

Figure 4:
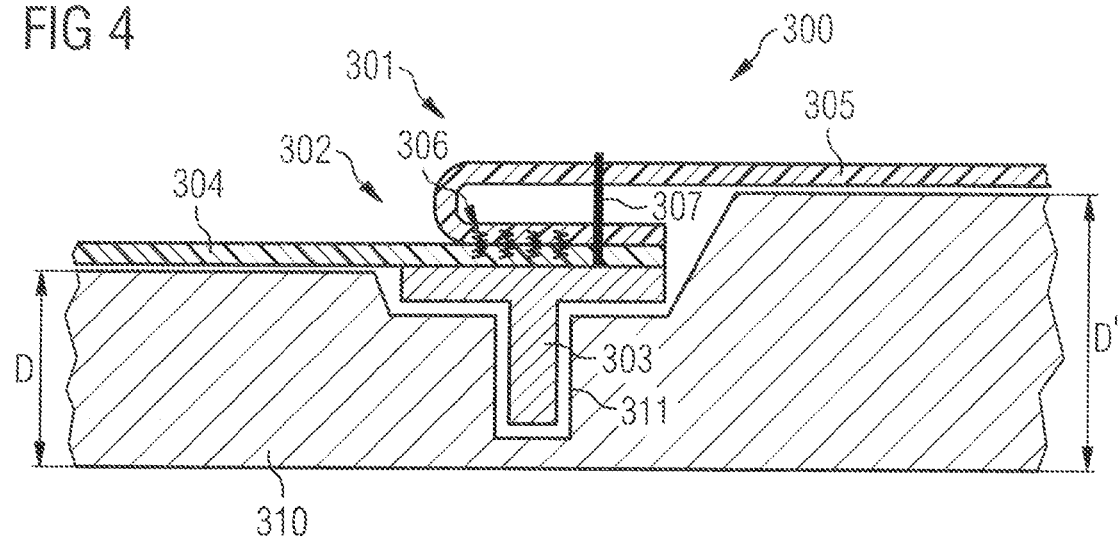
FIG. 4 a variant of a molded composite in accordance with the invention.

In FIG. 4, a molded composite 300 is shown which includes a composite part 301 and a support 310. The composite part 301 includes a decor skin 302 comprising a first skin 304 and a second skin 305 which are connected to one another via a weld seam 306 and a decorative seam 307. The decorative seam 307 is formed as a yarn seam in this respect. The decor skin 302 is connected to the holding portion 303 which is based on the holding portion 3 of FIG. 1 with respect to geometry.

The support 310 includes a cut-out 311 which is designed substantially in T shape analog to the holding portion. It must be noted in this respect that the thickness D to the left of the cut-out differs from the thickness D' to the right of the cut-out. Due to the geometry of the fold of the decor skin 302, the thickness D' of the support 310 is selected to be lamer so that the sections of the first and second skins 304, 305 disposed opposite the surface of the support end substantially flush with one another. Alternatively, the thickness of the support outside the cut-out can be selected as constant and a foam material injected between the surface of the support and the rear of the composite part can subsequently be used to anchor the composite part 301 in the support 310.

Figure 5:
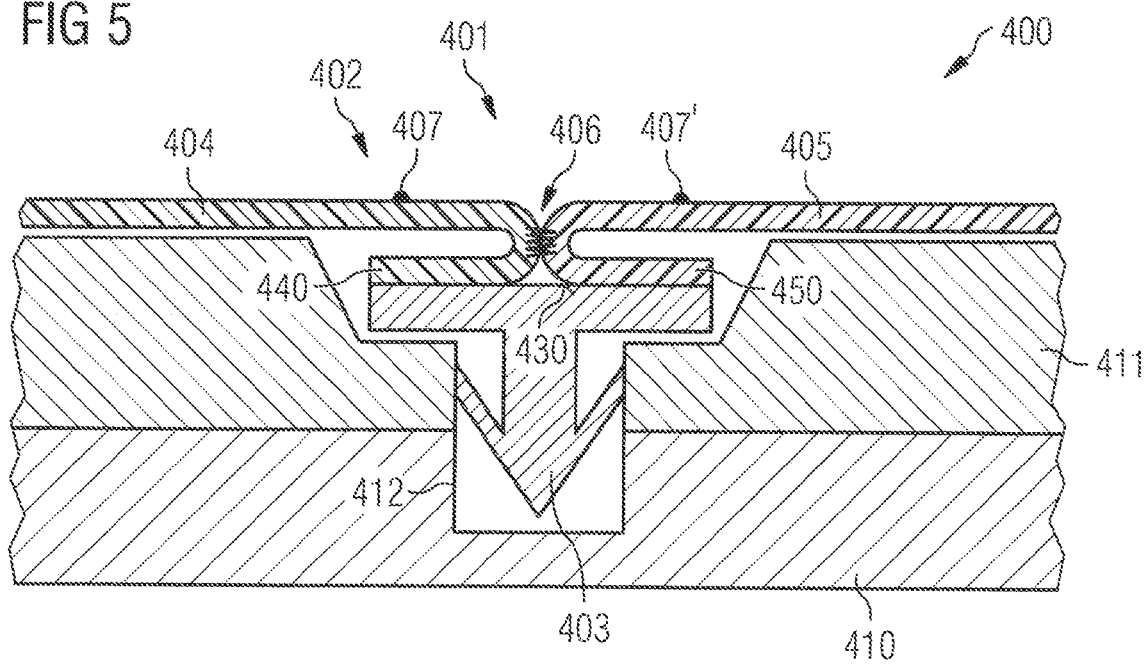
FIG. 5 a further variant of a molded composite in accordance with the invention.

In FIG. 5, a further variant of a molded composite 400 is shown which includes a composite part 401, with the composite part including a decor skin 402 and a holding portion 403. In addition to the composite part 401, the molded composite 400 includes a support 410 on which a knitted fabric layer 411 is arranged. The decor skin 402 includes a first skin 404 and a second skin 405 which are connected to one another by a weld seam 406. With respect to the geometry of the fold, the composite part 401 is similar to the geometry of the fold of FIG. 1. Beside the weld seam 406, the first and second skins each have a decor seam 407 and 407' respectively which were optionally introduced by decorative stitch methods. The holding portion 403 is substantially comparable with the holding portion 103 of FIG. 2. The midget seams 440 and 450 are in particular connected to the surface 430 of the holding portion 403.

A cut-out 412, which not only penetrates the support, but also the knitted fabric 411, is located in the support 410. The total shape of the cut-out 412 is in this respect likewise of T shape. The regions of the knitted fabric disposed opposite the first and second skins 404, 405 can be adhesively bonded to the corresponding regions of the skins, for example.

It must be pointed out at this point that the seams used in the respective embodiments can each also be used additionally or as substitutes in the other embodiments. The same applies to the material or to the geometry of the holding portions. The material of the first and second skins can also be swapped among one another. It must moreover be pointed out at this point that, for example in FIG. 2, the first and second skins 104 or 105 to the right of the decor seam 107 can be integrally connected to one another in that a loop in the form of a fold is also present here. The skin would accordingly be folded in S shape.

The invention claimed is:

1. A composite part having a decor skin with a first and a second section, each including at least one of leather and artificial leather, and a holding portion, wherein the first and second sections are connected to one another by a seam and a part region of the decor skin is connected to the holding portion with material continuity, wherein the part region includes the seam and the holding portion welded to the part region includes a layer of a thermoplastic polyester elastomer in the region of the weld and in the region of the seam.

2. The composite part in accordance with claim 1, wherein the first section includes a first skin and the second section includes a second skin, with the first and second skins being connected to one another via the seam.

3. The composite part in accordance with claim 1, wherein the part region of the decor skin is directly connected to the holding portion with material continuity.

4. The composite part in accordance with claim 1, wherein the holding portion at least partly includes a cross-member to be welded to the decor skin.

5. The composite part in accordance with claim 1, wherein at least 50% of the holding portion comprises a thermoplastic material.

6. The composite part in accordance with claim 1, wherein the seam is a yarn seam.

7. The composite part in accordance with claim 1, wherein the first and/or second sections are each folded over in the region of the seam.

8. The composite part in accordance with claim 1, wherein a seam construction is arranged between the first and second sections.

9. The composite part in accordance with claim 1, wherein the part region including the seam is welded to the holding portion.

10. A molded composite having a composite part in accordance with claim 1 and having a support, wherein the holding portion is held in a cut-out of the support or is held in a knitted fabric arranged on the support, in a foam layer or knitted fabric layer and the first and second sections are connected to the support or to the knitted fabric or to the foam layer or knitted fabric layer.

11. A method of manufacturing a composite part in accordance with claim 1, wherein the connection with material continuity is formed by welding.

\* \* \* \* \*